Aug. 4, 1970
C. J. R. SARTHOU
3,522,666
CHRONOLOGICAL BARS PROGRAMMING BOARD
Filed Oct. 30, 1967
2 Sheets-Sheet 1
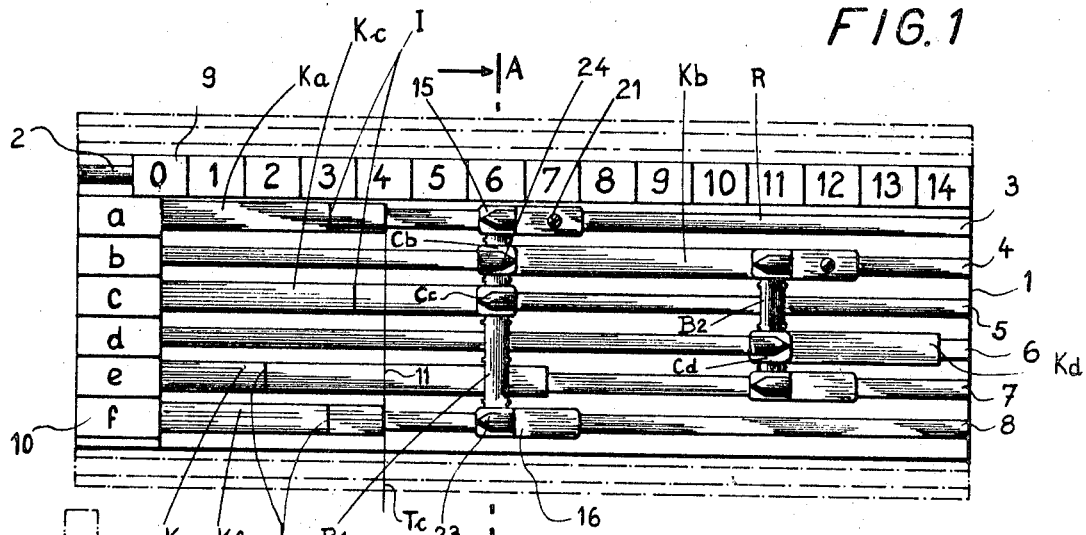
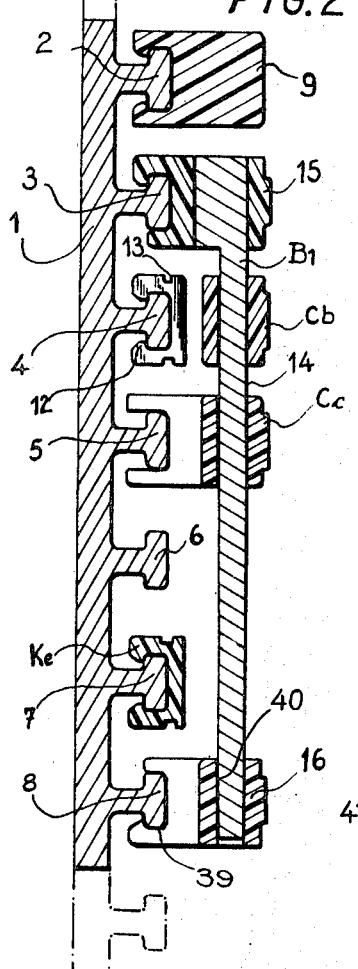
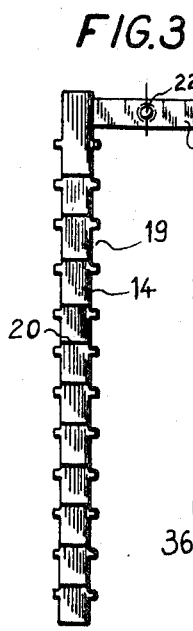
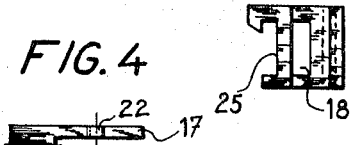
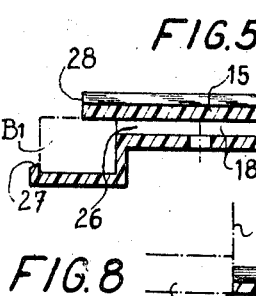
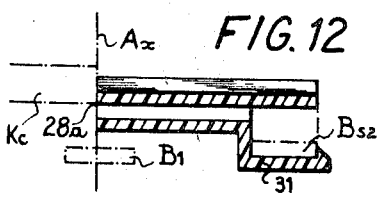
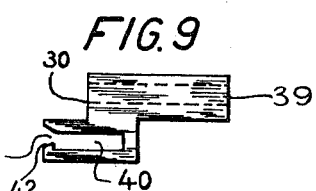
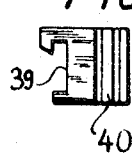

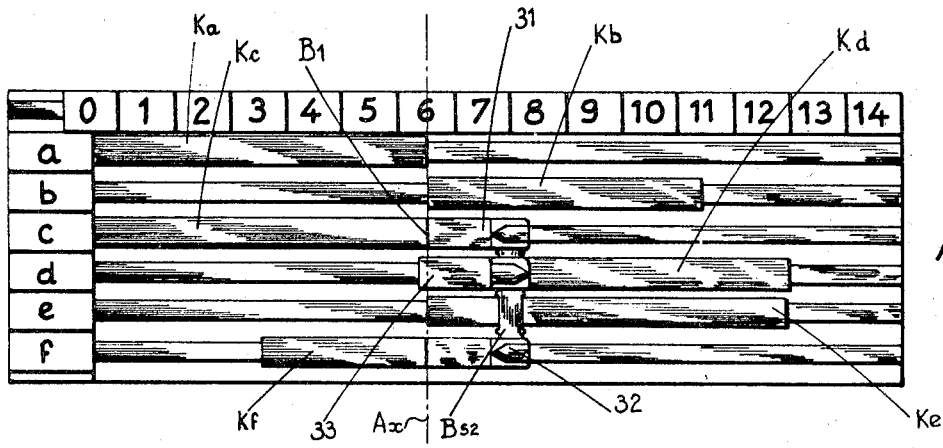
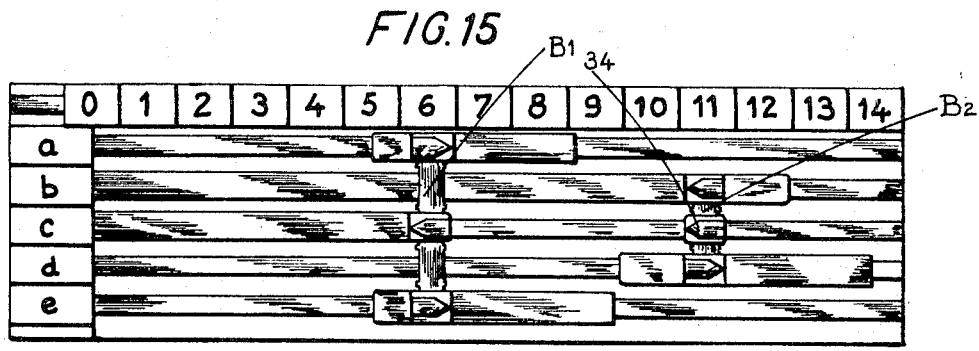
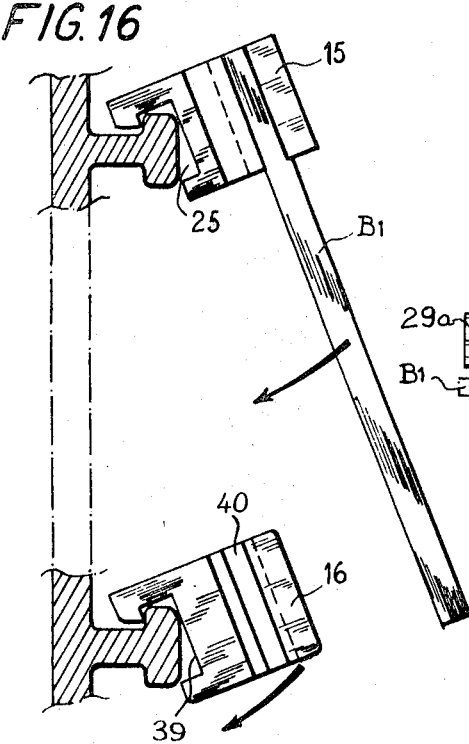
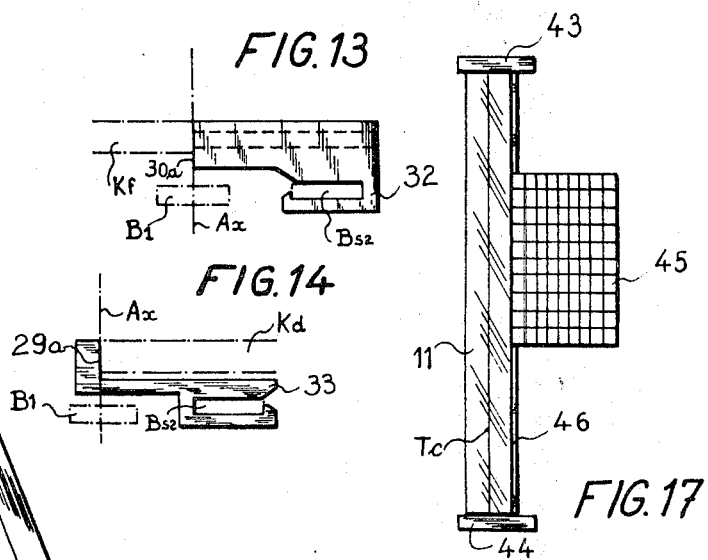

United States Patent Office 3,522,666
Patented Aug. 4, 1970

3,522,666
CHRONOLOGICAL BARS PROGRAMMING BOARD
Charles Jean Roger Sarthou, 52 Avenue Egle, 78 Maisons-Laffitte, France
Filed Oct. 30, 1967, Ser. No. 678,925
Claims priority, application France, Nov. 8, 1966, 82,918; July 3, 1967, 112,867; Sept. 26, 1967, 122,367
Int. Cl. G09b 19/18
U.S. Cl. 35—24           5 Claims

ABSTRACT OF THE DISCLOSURE

The invention relates to programming methods, such as the PERT method, which make use of arrow networks. The instant invention more particularly provides a planning board of universal use which is topologically equivalent with an arrow network and includes "chronological bars" provided with selector means.

---

The present invention relates to a planning board which is adapted to work up all planning methods based on network analysis and namely the critical path method, including PERT method (i.e. Program Evaluation and Review Technique).

These methods allow planning, analysis and scheduling and controlling of complex activity projects and resolution of problems derived from, i.e. charges leveling, means, man power and resource allocations, cost analysis, etc.

The critical path method allows, for one, to compute from an arrow network representing all operations of a program:

The "critical path," determined by the operations called "critical," that is to say such that any time increase of any of them will involve a time increase of the time limit set for the completion of the program. Any delay in any one of these operations extends the program's duration.

The "float" or "slack," that is to say the permissible time increase allowed to non critical operations with the effect on program's duration.

Starting and finishing time of critical operations.

Earliest and latest permissible starting time of non critical operations.

The layout of a program by means of a network is comparatively difficult to interpret and adapted to specialists only. Computation of specific items described above requires, most often, computers, which restricts its use. Necessary keeping up to date is long and expensive.

Spreading and generalizing these methods, in all firms and to all kind of business have not been possible because of these difficulties, though it would have been gainful.

It is further known to use so-called "parallel bar" diagrams in which operations are represented by horizontal segments, the anteriorities therebetween being materialized through vertical lines. In fact the use of such diagrams is limited to very simple cases.

Attempts have been made in view of designing a programming board adapted for replacing either arrow networks or parallel bars diagrams. It is self-evident that such a board will comprise a plurality of parallel lines on which can be removably placed and slide along elongated elements, the length of which is proportional to the duration of the various operations of the program, a time scale set along these parallel lines to show the duration of operations and removable stop members adapted for setting the anteriorities between the operations. As, in an arrow network there is, generally, a group of several operations directed toward a node of the network and a group of several operations starting from this node, and it is obvious to materialize each node by an elongated element perpendicular to the parallel lines, said elongated element defining a chronological axis, i.e. acting as a stop member with respect to the operations of the two groups. Such a transverse element obviously should be movable in a direction parallel to the lines, so as to afford keeping up to date of the board. Starting from these remarks it has not been possible, however, in prior art, to conceive an effectively useful board, which would, in any case, illuminate the critical path, the floats and all other informations given by an arrow network. Therefore, it is an object of the present invention to provide such a board.

Another object of the present invention is to provide a board which is adapted for giving a homeomorphical representation having all of the topological properties of such a network. Still another object is to provide a board of the above character in which the elements representing the chronological axes may be intersected by certain elements representing operations which are not related to the said chronological axes.

Yet a further object is a board of the above character, wherein the elements representing the chronological axes comprise selector units acting as removable stop members for the elements representing operations, such selector units carrying directional marks for enabling one to set the chronological elements in order.

Another object is a board wherein so-called "dumming" or "zero time" activities may be represented in a simple way.

Another object of the invention is such a board where the topological equivalence can be easily obtained even when the arrow network has nodes to which correspond superposed chronological axes.

Another object of the present invention is to incorporate to such a board a divided, movable, time scale, so that keeping up to date is simplified.

Yet a further object is to provide such a board in which elements representing operations, chronological elements and selector units can be easily taken in or off independently.

These and the other objects of the invention, as well as the advantages thereof will become apparent as reference is had to the following description and accompanying drawings. In the drawings:

FIG. 1 is a front view of a board in accordance with a preferred embodiment of the invention;

FIG. 2 is a cross section along A—A of FIG. 1;

FIG. 3 is a front view of an element representing a chronological axis (hereunder, referred to as a "chronological bar");

FIG. 4 is a top view of a chronological bar;

FIG. 5 is a cross section of the upper guide member of a chronological bar;

FIG. 6 is a side view of the upper guide member of a chronological bar;

FIG. 7 is a top view of a selector unit;

FIG. 8 is a side view of a selector unit;

FIG. 9 is a top view of the lower guide member of a chronological bar;

FIG. 10 is a side view of the lower guide member of a chronological bar;

FIG. 11 shows a network with two superposed chronological axes;

FIG. 12 is a cross section of a special upper guide member related to FIG. 11;

FIG. 13 is a top view of a special lower guide member related to FIG. 11;

FIG. 14 is a top view of a special selector unit related to FIG. 11;

FIG. 15 is a front view of a board with a dummy;

FIG. 16 illuminates how to set a chronological bar on rail and

FIG. 17 is a schematic drawing of a preferred embodiment of the slider.

FIGS. 1 and 2 show a board made of one rectangular section only (numbered 1), generally hung vertically. This section is provided with parallel grooves numbered 2 to 8. On the example shown, seven grooves are drawn. These grooves compose rails on which slide small bars called "operation's bars" such as $K_a$ to $K_f$, and "chronological bars" such as $B_1$ and $B_2$. A movable time scale 9 and a plaquette 10 carrying the designation of operations fit also on the rails. A slider 11, a preferred embodiment of which is illustrated by FIG. 17 has been merely symbolized, on FIG. 1, by a mark line $T_c$. The supplementary rails on which the slider will slide have been symbolized by mixed lines.

The time scale 9, not only movable but divided, is made of a series of juxtaposed detachable blocks, the cross section of one of them being shown on FIG. 2. These blocks are numbered 0 to 14 in the example described and form a linear graduation in which each block represents a defined period of time, established in terms of program's duration.

"Operation's bars" (the cross section of one of them $K_b$ is shown in FIG. 2) have a length proportional to the duration of the represented operation. They are made of standard elements the cross section of which is a U shape whose ends carry projections such as the ones numbered 12. This allows the operation's bars to slide and not to diverge, on the rails. These bars can be made of semi-rigid plastics and, by slight pressure, can be set on rails and easily taken out. The operation's bars carry on various indications of charges, manpower, costs, etc., necessary for analysis. Grooves, like the ones numbered 13, allow index or colored plates carrying any information to be fixed on.

The "chronological bars," as it will be explained later on, materialize the nodes of arrow networks. This means that they establish an anteriority between certain operations (such as $a, c, f$, FIG. 1, which are completely located at the left of bar $B_1$) and other operations (such as $b$, FIG. 1, which is completely located at the right of bar $B_1$). The first mentioned operations necessarily should end before the second mentioned one may be started. In practice, it necessarily exist, in a layout of network, some operations like $e$, which do not interest a certain node, but crossing however the corresponding chronological axis. According to an essential feature of the invention, chronological bars are so designed to allow free way to certain operation's bars like $K_e$, while stopping other operations $K_b$, $K_c$. For that purpose, as shown on FIGS. 2, 3 and 4, the frame 14 of the chronological bars is held up to a certain distance of standard section 1 by means of guide members 15 and 16, secured at the ends thereof, while the frame 14 carries removable selector clips, such as $C_b$ and $C_c$, which stop the operation's bars like $K_b$ and $K_c$ on the corresponding lines.

Now, the operation of the planning board illustrated in FIG. 1, and which corresponds to a very simple program, given as an illustration only, will be explained. This program is made of operations with time durations, respectively $a=4, b=5, c=6, d=3, e=7$ and $f=4$. Operations $a, c, e, f$ are on the left hand side of chronological bar $B_1$ and can begin with starting time. Operation $b$, on the right of $B_1$ can take place only when operations $a$, $c$ and $f$ are over, while operation $d$ on the right of $B_2$, can take place only when operations $b$ and $e$ are over.

Chronological bar $B_1$, which is used to set the anteriority of $a, c, f$, on the one hand, and $b$, on the other hand, carries a selector clip $C_b$ on line $b$ and a selector clip $C_c$ on line $c$. Guide members 15 and 16 can stop rightward sliding movement of operations $a$ and $f$, and are thus used as selectors. Chronological bar $B_1$ is necessarily set at the end of the longest time duration of previous operations $a, c$ and $f$, and immediately before the later operation $b$. There is no selector clip on operation $e$, which is independent, and a free way is allowed under chronological bar $B_1$.

As well, chronological bar $B_2$ carries a selector clip $C_d$ on line $d$ and upper and lower guides which stop rightward sliding of previous operations $b$ and $e$ on the left. The figuration so achieved has all topological properties of an arrow network. Moreover, time limit and date of realization are illuminated without any computation, by time scale reading.

It is easy to see that, for the program shown, operations $c, b$ and $d$ are "critical" since they determine the duration of the program and are blocked by the chronological bars. On the contrary, the slack of operations $a$, $e$ and $f$ allow a float respectively equal to 2, 4 and 2. The earliest permissible starting time of these operations takes place at the starting time of the program, while their latest permissible starting time is given by pushing bars $K_a$, $K_e$ and $K_f$ toward the right, until they are stopped by a chronological bar. These latest dates are respectively 2, 4 and 2. Once all the elements which represent the program have been placed on the board, it is useful, for keeping the board up to date, to tighten those of the chronological bars which are blocked by critical operations, with a screw such as 21, FIG. 1. As it is explained above, the time scale is preferably movable and divided. To show how important is the use of this time scale in keeping up to date the following example will be considered. At date 4, performing of work represented by operations $a, c, e, f$ is materialized with index I on operation's bars (FIG. 1). It can be seen that there is a delay in some operations, and checking is necessary. It is obvious that bar $K_c$, on critical path, cannot be moved rightward since it is blocked by bar $B_1$, but it is possible to slide rightward $K_a$, $K_e$ and $K_f$ until the corresponding index are in line with index on bar $K_c$. The slider 11 is to help this checking. From its initial position at the considered date 4, the line $T_c$ on the slider is moved on index I of $K_c$, then I index of $K_a$, $K_e$ and $K_f$ are moved to be in line under $T_c$. Then time scale 9 is moved leftward until 4 is under the new position of $T_c$. The entire program is rapidly and easily up to date.

The new position of scale 9 shows the total delay. This delay is read at place of initial zero. In the figure shown, this index is constituted by the right edge of plaquette 10. If a new delay occurs later on, the new position of scale 9 will show cumulated total delay. Of course, it may happen that during the setting up to date operation, the first blocks such as 0, 1, 2, 3 will come out of the board limits: the said blocks will then be removed and new blocks 15, 16, 17, 18 will be placed at the right end of the time scale.

Directions marks on selector devices, guides and clips, are an important feature of the invention. These direction marks will preferably consist of arrows, such as 23–24, FIG. 1, carried on the front faces of the selector devices and oriented towards the operation's bar which is stopped by the clip of guide: for example, arrow 23 is oriented towards bar $K_f$, while arrows 24 is oriented towards bar $K_b$. As shown on the example, it must always exist on a same line either two inward pointed arrows to enclose an operation's bar (line $b$) or lonely arrow to show beginning or finishing operations: it can be ascertained that all chronological bars are set in order when the arrows concerning the same operation are pointed inward. It is emphasized that setting up the chronological bars in order, that is to say placing successively each chronological bar in proper position on the board can be done before placing operation's bars. Arrows make this operation very easy and avoid previous drawing of a graph. This is a great advantage of the invention: if there is an error in the logical analysis of the program, it can be seen at a glance, orientations of arrows cannot be correct. When this planning is set up, it is exactly equivalent to an arrow network.

Now some constructional details of a preferred embodiment of the invention will be described.

Chronological bars will advantageously be made of hard strain resisting steel to suffer minimum elastic deformation when operation's bars are pushed during handling. Selector clips can be held during handling by means of gaps 19, FIG. 3, in frame 14. The chronological bars can be cut to convenient length owing to beginnings of breaking 20, FIG. 3, so the board is not littered with extra length of bars. Upper part of frame 14 is bent (17). This bent portion will move easy in slot 18 of upper guide as shown in FIG. 5. When they are set in place, chronological bars could be blocked with cylindrical headless screw 21, FIG. 1, screwed in thread cut opening 22 of bent 17. Blocking can be made by pressure on rails with interpolation of plastics between slot 18 and groove 25. No direct contact with screw prevents wear of rails.

Upper guides like 15 on FIGS. 1 and 2 are shown in detail on FIGS. 5 and 6. These guides can slide slackless and can be held on rails by means of asymmetrical groove 25. The bent part 17 of frame of chronological bars fits in slot 18. The upper part of frame 14 of chronological bars fits in slot 26. When they are in proper position, chronological bars are connected with upper guides by means of hook 27 which clamps because of elasticity of material. These guides are made of antifriction with high elasticity modulus plastics to make slackless easy sliding along rails, to prevent wear, to maintain frame 14 perpendicular to rails and to get the position of hook back when taking the bar in.

The selector movable clips such as $C_b$, $C_c$ FIG. 1, are shown in detail on FIGS. 7 and 8. The main part of the clip fits in groove 19 of frame 14 of chronological bars which are introduced crosswise in slot 35 through opening 37. When the bar is passed through, the hook 38 clamps because of elasticity of material and holds clip in proper position. The groove 36 fits unrestrainedly on rails. Lower guides such as 16 on FIGS. 1 and 2 are shown in detail on FIGS. 9 and 10. The guides can slide unrestrainedly, though they are maintained on rails by the asymmetrical groove 39. The lower part of chronological bar is introduced crosswise in slot 40 through opening 41. When the bar is passed through, the hook 42 clamps because of elasticity of material. Like upper guides, clips and lower guides are preferably made of antifriction with high elasticity modulus plastics.

Faces of upper guides, clips and lower guides (respectively 28, 29 and 30, FIGS. 5, 7, 9) are accurately located on the chronological axis, so, whatever their direction, the operation's bars abut against these faces and end on the chronological axis. So, the width of chronological bar has no effect when two operations are added on each side of chronological bar. It can be noticed that upper and lower guides are used as selectors, so space is gained and capacity of planning enlarged.

FIG. 16 illustrates, when the chronological bar is set on guide 15, how to fix on rail, introducing slantwise and moving clockwise as shown by arrow. Lower guide 16 is then introduced and interlocked on rail of the same manner. Finally, sliding lower guide 16 on rail, bar $B_1$ is introduced in groove 40. It is clear that, thanks to the described structure, chronological bars can be very easily taken in or off independently.

It must be understood that a board of the character described is satisfactory in practice only if it is universal, that is to say, if any network can be represented. It is not possible to survey all possible situations, but it can be shown that such a board can face them. In particular, this board allows representation of network with superposed chronological axes, as shown on FIG. 11. The board of FIG. 11 shows a network with two superposed chronological axes, where operation $a$ ends to and operations $b$ and $e$ start from the first one, and operations $c$ and $f$ end to and operation $d$ starts from the second. The two superposed chronological axes could not be easily materialized with two superimposed chronological bars. The present invention uses a normal chronological bar $B_1$, identical to the ones described above, and set along the chronological axis $A_x$ representing the first node, and a bar $BS_2$ with special guides and clips used as selectors (FIGS. 12 to 14) representing the second node. The bar $B_1$, being of the "normal" type already described, is symbolized on FIG. 11 by a mixed dash line on $A_x$ axis. Operation's bars $K_a$ and $K_2$ are stopped respectively by upper guide and lower guide of bar $B_1$, and operation's bar $K_b$ is stopped by the clip on bar $B_1$. The special bar $BS_2$ carries an upper guide 31 shown on FIG. 12, a lower guide 32 shown on FIG. 13 and a selector clip 33 shown on FIG. 14. The main characteristic of these special devices with respect to the normal devices is that their faces of abutment (28a, 30a and 29a, respectively) though they are on chronological axis $A_x$ are shifted with respect to axis of symmetry bar frame $BS_2$. At the contrary, bar $B_1$ is on the $A_x$ axis and its frame crosses over the special devices.

It can be seen, from the above description and from the drawings, that special guides and clips 31, 32 and 33 permit representation with two separate chronological bars of two or more nodes which could have superposed chronological axes at a certain period of realization of the program. Among the numerous feasibilities of such a board, and to be short, the situation shown on FIG. 15 will only be surveyed. In this case, on one hand, operations $a$ and $e$ can start only when operation $c$ is finished, on the other hand, operation $d$ cannot start before operation $b$ is finished, with the additional condition that operation $c$ must be finished before operation $d$ starts. Chronological bar $B_1$ shows the anteriority of operation $c$ with respect to $a$ and $e$, and chronological bar $B_2$ shows the anteriority of operation $b$ with respect to $d$. But this is not enough to impose, whatever the modifications which can happen in respective durations of operations, the additional conditional condition of anteriority of operation $c$ with respect to $d$. This additional condition is expressed in theory of networks by addition of a dummy or zero-time activtiy with no work nor time content, between nodes represented by $B_1$ and $B_2$. Such dumming or zero-time activities are defined, in particular, in "Planning and Control with PERT/CPM," by Richard I. Levin and Charles A. Kirkpatrick, McGraw-Hill Co., New York, 1966. In the board as illustrated, to express this constraint, a selector clip 34 is placed on bar $B_2$, directed toward operation $c$ and on the same line as operation $c$. It is clear that the presence of this clip imposes always the relation of anteriority between operations $c$ and $d$.

FIG. 17 illustrates a preferred embodiment of slider 11 of FIG. 1. This slider comprises two sliding guides 43 and 44 running on rails of the board. A transparent plaquette 45 is fixed on between. On this slider is drawn a mark line $T_c$.

A graling is drawn on a separate transparent plaquette 47 which can slide along the bar 46. This plaquette 47 can also rotate around this axis and allow making easy local explorations.

It is to be understood that various modifications could be made to the embodiments disclosed and illustrated without departing from the spirit and scope of the invention.

What is claimed is:

1. A programming board for representing an arrow network with topological equivalence and providing the critical path, the float of non critical operations and any other items of information concerning the operations of a program, said board comprising a support member, a plurality of parallel paths on said member, removable elongated longitudinal elements having lengths respectively proportional to the durations of said operations, a time scale along said paths and removable elongated transverse elements at right angles to said paths for establishing anteriorities between the respective operations, the longitudinal and transverse elements being movable in a direction parallel to said paths, wherein the transverse elements each have an elongated rigid body, securing means on said body, said securing means cooperating with said support member for maintaining said elongated body perpendicular to said paths and at a distance from said support member which is sufficient for allowing passage of the longitudinal elements between said elongated body and said support member, while allowing the free displacement of the transverse element as a whole, and selector devices removably secured on the rigid body of each of said transverse elements at the crossing thereof with the said paths, said selector devices being freely movable simultaneously along said paths when driven through the said displacement of the transverse element and having plane surface portions at right angles to said support member for stopping the longitudinal elements, wherein said elongated transverse elements each have an axis perpendicular to said paths and said plane surface portions of the selectors secured on the rigid body of each said transverse element are located along the axis of the element to which they are secured.

2. A programming board as claimed in claim 1, wherein the parallel paths are shaped as elongated projections, said securing means comprise first and second guide members at the respective ends of said elongated body, each of said guide members having a plane surface portion located along said axis of the elongated body to which they are secured for stopping a corresponding longitudinal element, said guide members being adapted for sliding along the said elongated projections.

3. A programming board for representing an arrow network with topological equivalence and providing the critical path, the float of non critical operations and any other items of information concerning the operations of a program, said board comprising a support member, a plurality of parallel paths on said member, removable elongated longitudinal elements having lengths respectively proportional to the durations of said operations, a time scale along said paths and removable elongated transverse elements at right angles to said paths for establishing anteriorities between the respective operations, the longitudinal and transverse elements being movable in a direction parallel to said paths, wherein the transverse elements each have an elongated rigid body, securing means on said body, said securing means cooperating with said support member for maintaining said elongated body perpendicular to said paths and at a distance from said support member which is sufficient for allowing passage of the longitudinal elements between said elongated body and said support member, while allowing the free displacement of the transverse element as a whole, said securing means being made of plastic material and having asymmetrical cut out portions having first and second sides, the first side being shaped as a hook, the parallel paths being shaped as elongated projections, which engage the said cut out portions, and selector devices removably secured on the rigid body of each of said transverse elements at the crossing thereof with the said paths, said selector devices being freely movable simultaneously along said paths when driven through the said displacement of the transverse element and having plane surface portions at right angles to said support member for stopping the longitudinal elements.

4. A programming board for representing an arrow network with topological equivalence and providing the critical path, the float of non critical operations and any other items of information concerning the operations of a program, said board comprising a support member, a plurality of parallel paths on said member, removable elongated longitudinal elements having lengths respectively proportional to the durations of said operations, a time scale along said paths and removable elongated transverse elements at right angles to said paths for establishing anteriorities between the respective operations, the longitudinal and transverse elements being movable in a direction parallel to said paths, wherein the transverse elements each have an elongated rigid body, said body comprising a rigid bar and a rigid bent portion at one end of said bar, said rigid portion being perpendicular to said bar, securing means on said body, the securing means corresponding to each said rigid portion being shaped as elongated blocks having each an elongated lodgment parallel to the said paths, said lodgment being adapted for receiving said bent portion, closely fitting therein, whereby the elongated body is tightly maintained in a direction perpendicular to said paths.

5. A programming board as claimed in claim 1, wherein the time scale essentially consists of a plurality of detachable blocks slidably mounted along one of said paths.

References Cited

UNITED STATES PATENTS 3,162,174 12/1964 Whyte.
3,290,797 12/1966 Opel.

FOREIGN PATENTS 646,016 1964 Belgium.

EUGENE R. CAPOZIO, Primary Examiner

W. H. GRIEB, Assistant Examiner

U.S. Cl. X.R.

116—135